United States Patent [19]
Onizuka et al.

[11] Patent Number: 5,973,491
[45] Date of Patent: *Oct. 26, 1999

[54] SYSTEM INTERCONNECTION GENERATOR

[75] Inventors: Keigo Onizuka, Gunma-ken; Masaki Madenokouji, Honjyo; Hisashi Tokizaki, Gunma-ken, all of Japan

[73] Assignee: Sanyo Electric Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/780,324

[22] Filed: Jan. 8, 1997

[30] Foreign Application Priority Data

Feb. 26, 1996 [JP] Japan ........................................ 8-38534
Jul. 12, 1996 [JP] Japan ...................................... 8-183571

[51] Int. Cl.⁶ .................................................... H02M 7/48
[52] U.S. Cl. ............................ 323/906; 363/41; 363/124
[58] Field of Search ................................. 363/34, 40, 41, 363/43, 124; 323/906

[56] References Cited

U.S. PATENT DOCUMENTS

| | | | |
|---|---|---|---|
| 4,354,223 | 10/1982 | Turnbull | 363/124 |
| 4,680,690 | 7/1987 | Dickerson | 363/43 |
| 5,499,178 | 3/1996 | Mohan | 363/40 |
| 5,560,218 | 10/1996 | Jang | 323/906 |
| 5,627,737 | 5/1997 | Maekawa et al. | 363/40 |
| 5,677,833 | 10/1997 | Bingley | 323/906 |

FOREIGN PATENT DOCUMENTS 7-203469  8/1995  Japan .

Primary Examiner—Peter S. Wong
Assistant Examiner—Derek J. Jardieu
Attorney, Agent, or Firm—Wenderoth, Lind & Ponack, L.L.P.

[57] ABSTRACT

A system interconnection generator comprising a power converting unit for converting solar energy into AC power by using a voltage chopping waveform, the ON duty of which is adjusted, thereby to supply the converted AC power to the system for a commercial AC power source. The distortion of the current waveform of the AC power supplied from the system interconnection generator to the system is detected to correct the ON duty of the chopping section after 360 degrees of the chopping section, in accordance with the distortion which has been detected.

6 Claims, 14 Drawing Sheets

SYSTEM INTERCONNECTION GENERATOR

BACKGROUND OF THE INVENTION

1. Field of the Invention

The present invention relates to a system interconnection generator for converting solar energy into AC power a commercial AC power system and, more particularly, to a system interconnection generator for suppressing the waveform distortion of the AC power to be fed to the system.

2. Prior Art

The power generator of the prior art, using solar energy, is disclosed in Japanese Patent Application Laid-Open No. 7-203469/1995.

This power generator, as disclosed, is intended to bring the AC power, as outputted from the system interconnection generator, and the AC power of the system into phase at a zero-cross point to thereby prevent the waveform distortion, as might otherwise come from the distortion of the phase.

In the system interconnection generator of the prior art thus constructed, the waveform distortion can be suppressed by setting the individual phases in phase but cannot suppress the distortion which is based upon the characteristics of the individual components of the system interconnection generator.

SUMMARY OF THE INVENTION

The present invention provides a system interconnection generator for correcting the distortion of the waveform itself directly.

According to a first aspect of the present invention, there is provided a system interconnection generator comprising a power converting unit for converting solar energy into AC power by using a voltage chopping waveform, the ON duty of which is adjusted, thereby to tie the converted AC power with the system for a commercial AC power source. Further comprised is a correction unit for detecting the distortion of the current waveform of the AC power, as fed from the system interconnection generator to the system, to correct the ON duty of the chopping section after 360 degrees of the chopping section, the distortion of which has been detected, in accordance with the distortion.

According to a second aspect of the present invention, there is provided a system interconnection generator comprising a power converting unit for converting solar energy into AC power by using a voltage chopping waveform, the ON duty of which is adjusted, thereby to supply the converted AC power to the system for a commercial AC power source. The voltage chopping waveform is divided for one period sequentially at an equal interval into a plurality of sections. Each of the sections with such an ON duty as to establish a quasi-sine wave. At a predetermined phase time of the system, outputs are consecutively made from the section corresponding to the section, and the ON duty of the corresponding section is so corrected after 360 degrees that the actual current values of the individual sections may reach the theoretical current values. As a result, both the distortion coming from the deviation of the current phase and the distortion coming from the characteristics of the individual appliance parts can be corrected by changing the ON duty.

By using the zero-cross point of the system for the in-phase currents, moreover, this in-phase can be easily effected.

The present invention will be described in connection with its embodiments with reference to the accompanying drawings.

DETAILED DESCRIPTION OF PREFERRED EMBODIMENT

Figure 1:
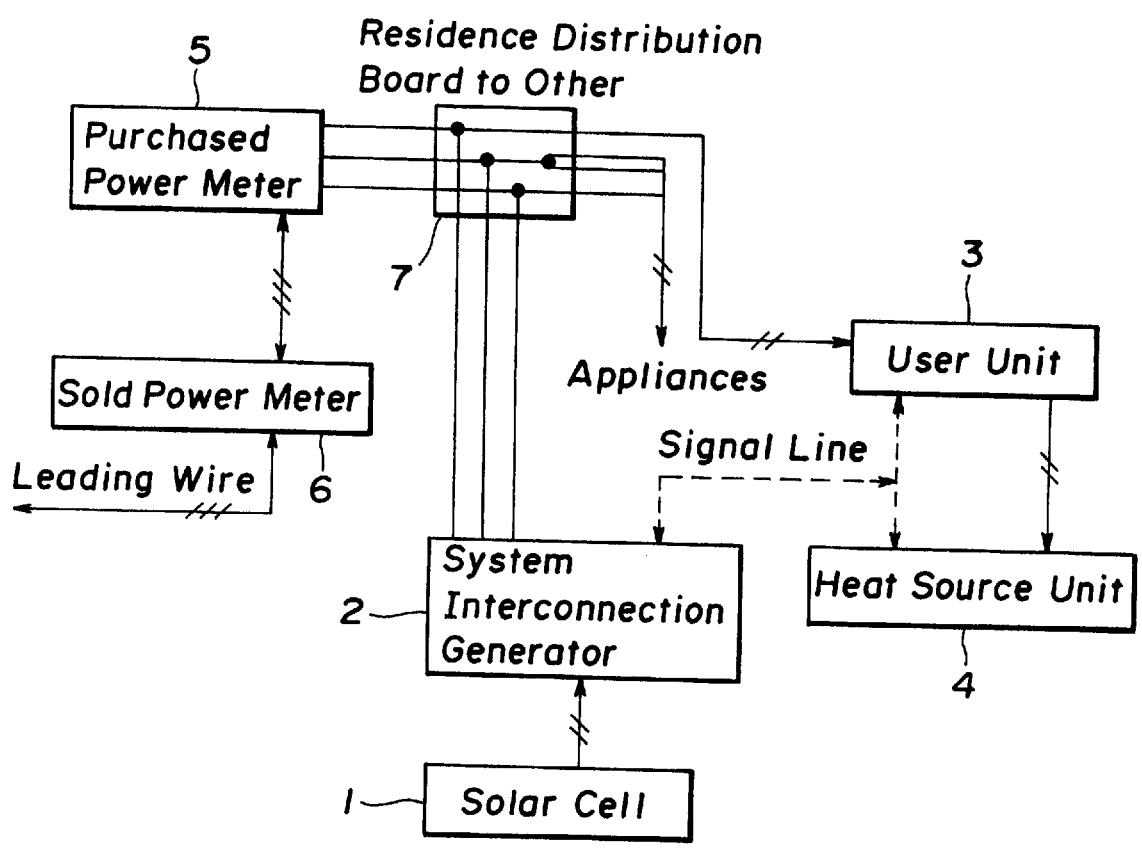
FIG. 1 is a schematic diagram showing the relation between the system interconnection generator of the present invention and the air conditioner.

FIG. 1 is a schematic diagram showing relations between a system interconnection generator (constructed of a solar cell and a system interconnection generator) and an air conditioner (constructed of a user unit and a heat source unit) according to the present invention.

In FIG. 1, the solar energy is obtained from a solar cell 1. This solar energy is converted into a predetermined AC power (of single-phase three-line type at 200 V) and then supplied to the system of the commercial power source.

A user unit 3 is placed in a room to be conditioned and includes a separate type air conditioner together with a heat source unit 4. The AC power is supplied from the user unit 3 to the heat source unit 4, and control data are transferred between the user unit 3 and the heat source unit 4 through a signal line. This signal line is interrupted by the signal line of the system interconnection generator 2 so that the data can be transferred between the system interconnection generator 2, the user unit 3 and the heat source unit 4.

A purchased power meter 5 and a sold power meter 6 are connected in series with the system (e.g., the transformer mounted on a pole, for example) of the commercial AC power source through a leading wire. The purchased power meter 5 indicates the electric energy to be purchased by the user from the system, and the sold power meter 6 indicates the electric energy to be sold from the user to the system.

A residence distribution board 7 is connected in series with the purchased power meter 6 and the sold power meter 6 to distribute the power to the individual electric appliances in the residence of the user. This residence distribution board 7 transforms the AC power of single-phase three-line 200 V to an AC power of single-phase 100 V.

The output of the system interconnection generator 2 is outputted to the residence distribution board 7 (or substantially between the purchased power meter 5 and the residence distribution board 7) so that the generated excessive power, as not used in the residence, is fed through the sold power meter 6 and the purchased power meter 5 to the system. The power purchasing is enabled by setting the voltage of the AC power to be outputted from the system interconnection generator to a higher level than that of the system.

Figure 2:
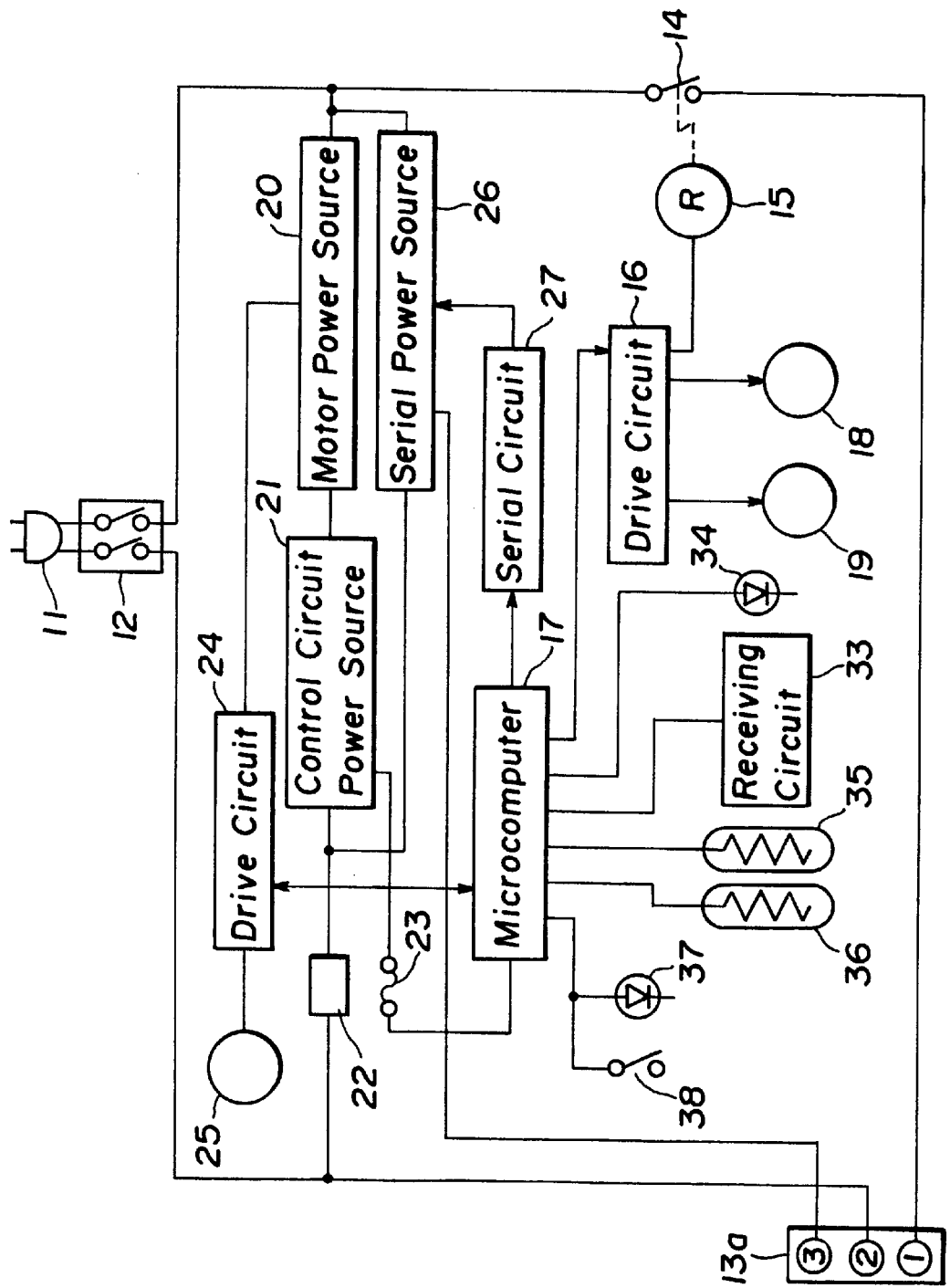
FIG. 2 is a block diagram of the control circuit of the user unit of the air conditioner.

FIG. 2 is a block diagram of a control circuit of the user unit 3. In FIG. 1, a plug 11 is connected to the residence distribution board 7 so that it may receive the supply of the AC power of single-phase 100 V.

A connector 13a can feed the AC power from the user unit 3 to the heat source unit 4 and transfer the control data among the system interconnection generator 2, the user unit 3 and the heat source unit 4. Specifically, both the connector 13a and a connector 13b (as mounted on the heat source unit 4) are electrically connected at their terminals having the same numbers. The terminals (2) and (3) of a connector 13c (as leading from the system interconnection generator) are connected between the terminals (3) of the connector 13a and the connector 13b.

Numeral 14 designates a normally open contact of a power relay 15 so that the AC power obtained from the plug 11 is outputted to between the terminals (1) and (2) of the connector 13a when the contact 14 is closed.

A drive circuit 16 (e.g., a general purpose buffer circuit or drive circuit) is operated with the output coming from a microcomputer 17 (e.g., a general purpose microprocessor having a plurality of analog/digital conversion input terminals and input/output terminals) to turn ON the power relay 15 in response to the output of the microcomputer 17. This power-ON is effected when the microcomputer decides that the air conditioner can perform the normal operations.

A vertical flap motor 18 (or a stepping motor) is provided for changing the angle of vertical flaps to change the discharge direction of the conditioned air, as discharged from the user unit 3 into the room, in accordance with the step number. In other words, this flap motor rotates forward/ backward step by step in response to the forward/backward pulses outputted from the microcomputer so that an angle of rotation (or the flap angle) is achieved according to the output number of the pulses stored in the microcomputer 17.

The microcomputer 17 outputs the pulses, as required for the flap motor 18 to reach the designed angle of the initial position, to fully open/close the flaps, and then sets the relation between the subsequent flap angle and the pulse number with reference to the position of the flaps.

When the angle of the flaps is set to the desired value, the microcomputer 17 outputs the pulses until the flap angle reaches the value set by a remote controller. In the automatic setting case, moreover, the microcomputer 17 increases/ decreases the step number automatically so that the flaps swing. Incidentally, this swing range is set to become different between a cooling run and a heating run.

A horizontal flap motor 19 (or a step motor) is provided for changing the angle of horizontal flaps to change the discharge direction of the conditioned air, as discharged from the user unit 3 into the room, in accordance with the step number. The operations of this flap motor 19 are similar to those of the flap motor 18.

As a result, the discharge direction of the conditioned air, as discharged from the user unit 3, can be arbitrarily controlled in the vertical/horizontal directions by controlling the flap motor 18 and the flap motor 19.

Numerals 20, 21 and 22 designate a motor power source, a control circuit power source and a current fuse, respectively, which are connected in series with the commercial AC power source connected through the plug 11. A temperature fuse 23 will fuse, when the temperature in the user unit 3 or the ambient temperature of the electronic parts of the microcomputer 17 or the like rises, to cut off the feed of the working power from the control circuit power source 21 to the microcomputer 17.

The motor power source 20 outputs constant voltages at DC 48 V and at DC 12 V, for example. Of these, the DC 48 V is fed to a drive circuit 24, and the DC 12 V is outputted to the control circuit power source 21 and acts as a drive power source for the power relay 15 and the step motors 18 and 19. The control circuit power source 21 outputs a constant voltage of DC 5 V for the electronic parts.

The drive circuit 24 drives a fan motor 25 (e.g., a brushless DC motor for driving a fan to discharge the conditioned air into the room) and is constructed to output a three-phase alternating current, which repeatedly turns conductive for 120 degrees and inconductive for 60 degrees, by connecting six switching elements (e.g., power transistors or power FETs) in a three-phase bridge shape and by turning ON/OFF the individual switching elements.

This three-phase alternating current is divided into six kinds of conduction patterns each having one period of 60 degrees so that the conduction patterns are sequentially switched, as the rotor turns every 60 degrees, to output the three-phase alternating current of one period for each rotation of the rotor. In short, the rotor continues its rotations by switching the conduction patterns sequentially in accordance with the rotational position of the rotor.

The number of revolutions of this fan motor 25 can be changed by changing the DC voltage to be applied to the motor 25, because this motor is a DC motor. This number of revolutions increases, as the applied voltage rises, and decreases as the applied voltage drops. Specifically, the applied voltage may be changed by chopping the voltage of DC 48 V, as obtained from the motor power source 20, or the substantial applied voltage may be changed by chopping the conduction of three-phase AC 120 degrees to be fed to the fan motor 25, at a predetermined ON duty to change this ON duty. The applied voltage is raised, if the ON duty is increased, and lowered if the ON duty is decreased.

The position transduction of the rotor can be exemplified by making a decision from the output of a magnetic detection element or from the change in the induced voltage which is induced by the rotation of the rotor.

The microcomputer 17 controls the ON/OFF of the switching element of the drive circuit 24 so that the corresponding conduction patterns may be achieved on the basis of the detected rotational position of the rotor, and adjusts the applied voltage so that the fan motor 25 may be fed with the voltage necessary for achieving a predetermined number of revolutions.

The control of this fan motor 25 is effected by the automatic operation, in which the number of revolutions is automatically changed according to the characteristics predetermined on the basis of the difference between the room temperature and the set temperature (or the desired temperature), or by the manual operation, in which the fan motor is fixed at a desired number of revolutions.

Figure 3:
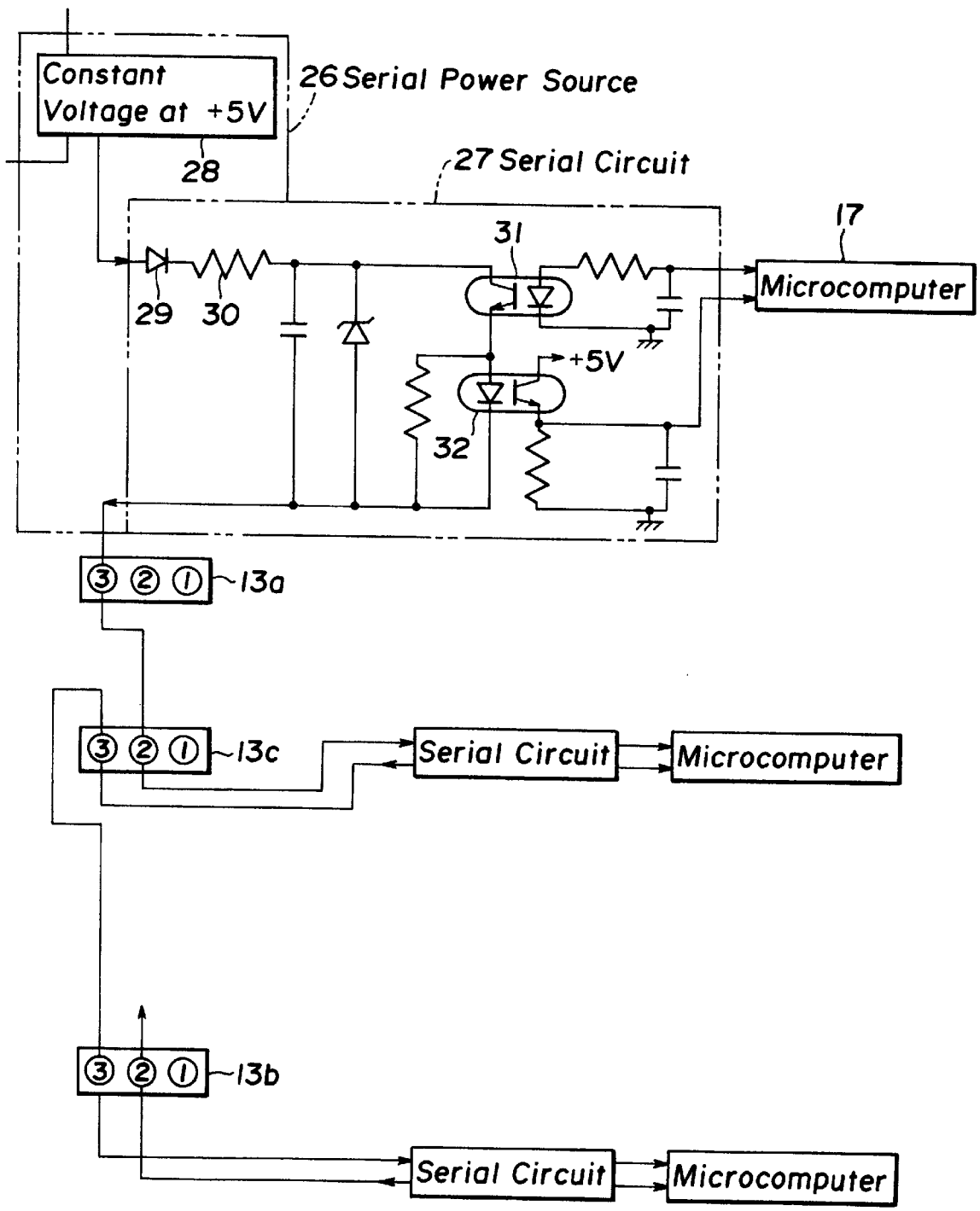
FIG. 3 is an electric circuit diagram showing the relation among the serial power source, the serial circuit and the microcomputer.

FIG. 3 is an electric circuit diagram showing a relation between a serial power source circuit 26 and a serial circuit 27, and the microcomputer 17. Incidentally, FIG. 3 also shows the connections between a serial circuit 40 and a microcomputer 41 of the heat source unit 4 and between a serial circuit 70 and a microcomputer 71 of the system interconnection generator 2 in terms of the individual connections of the connectors 13a to 13c.

The serial power source circuit 26 has a constant voltage circuit 28 which is connected through the current fuse 22 with the commercial AC power source of 100 V, for outputting a DC 5 V. This constant voltage circuit 28 can be constructed by using a general purpose constant voltage IC.

The output of this constant voltage circuit 28 is connected in series with the terminal (3) of the connector 13a through a diode 29, a resistor 30, the light receiving element of a signal outputting photocoupler 31 and the light emitting element of a signal receiving photocoupler 32, which are connected in the forward direction. The terminal (2) of the connector 13b forms one of the power lines and is connected with the terminal (2) of the connector 13a so that it is used commonly with the ground side output of the constant voltage circuit 28.

The serial circuit 27 has the same construction as that of the serial circuit 70 of the system interconnection generator or the serial circuit 40 of the heat source unit 4 so that these three serial circuits are connected in series with the constant voltage circuit 28.

The light emitting element of the signal outputting photocoupler 31 of the serial circuit 27 is turned ON/OFF with the output of the microcomputer 17 and is usually (e.g., at the standby time prepared for signal reception) ON. On the other hand, the light receiving element of the signal receiving photocoupler 32 transforms its ON/OFF outputs into a voltage change and outputs it to the microcomputer 17. The serial circuit 27 is usually (when it receives no signal) ON so that its output to the microcomputer 17 is at an H voltage (e.g., +5 V in the present embodiment).

As a result, the microcomputer 17 turns ON/OFF the light emitting element of the photocoupler 31, when it outputs the signal, with the ON/OFF signal, as based upon the common protocol and data format. This ON/OFF signal is transformed into the ON/OFF of the output of the constant voltage circuit 28, and this ON/OFF is transmitted to the individual microcomputers through the ON/OFF of the light receiving elements of the signal receiving photocouplers of the individual serial circuits 27, 40 and 70.

Upon the signal receptions, the ON/OFF of the output of the constant voltage circuit 28, as obtained by the ON/OFF of the signal outputting photocoupler of any serial circuit, is received by the signal receiving photocouplers of all the serial circuits and is outputted to the individual microcomputers. Since this signal is set with a code for designating its reception destination, the signal, as received only by the microcomputer corresponding to the code, is decided to be valid and is used for the control.

The serial circuit 27 has a noise absorbing capacitor, a photocoupling protecting Zener diode and a resistor.

In FIG. 2, moreover, numeral 33 designates a receiving circuit for receiving the signals (e.g., the ON/OFF signals of the air conditioner, the control signal for controlling the wind of the air conditioned by the fan motor 25, the control signals for the flap motors 18 and 19 for changing the wind direction, the signal indicating the set temperature, the signal indicating the detected room temperature, the signal validating the demand, and other signals to be sent according to the operations of the switches) coming from a wireless remote controller (using radio signals such as infrared signals, radio waves or sound waves), and converts them into predetermined serial codes to feed the serial codes to the microcomputer 17. When these serial codes are valid, the microcomputer 17 performs the controls on the basis of the signals.

A display LED unit 34 is arranged in the vicinity of the light receiving portion of the receiving circuit 33 to indicate the running state of the air conditioner such as the run/stop or a timer operation.

Numerals 35 and 36 designate temperature sensors for detecting the temperature of a heat exchanger forming the refrigerating cycle for the air conditioning and the temperature of the room around the user unit 3. These temperature sensors are exemplified by negative characteristic thermistors so that the microcomputer 17 subjects the voltage corresponding to the resistances, as varied with the change in the temperature, to an A/D conversion (i.e., an analog/digital conversion) for the fetching controls.

Numeral 37 designates a service displaying LED unit for restoring and displaying an abnormality, if any in the air conditioner.

Numeral 38 designates a switch unit for displaying the switching of the running modes of test run/normal run/stop or the abnormal recording.

Figure 4:
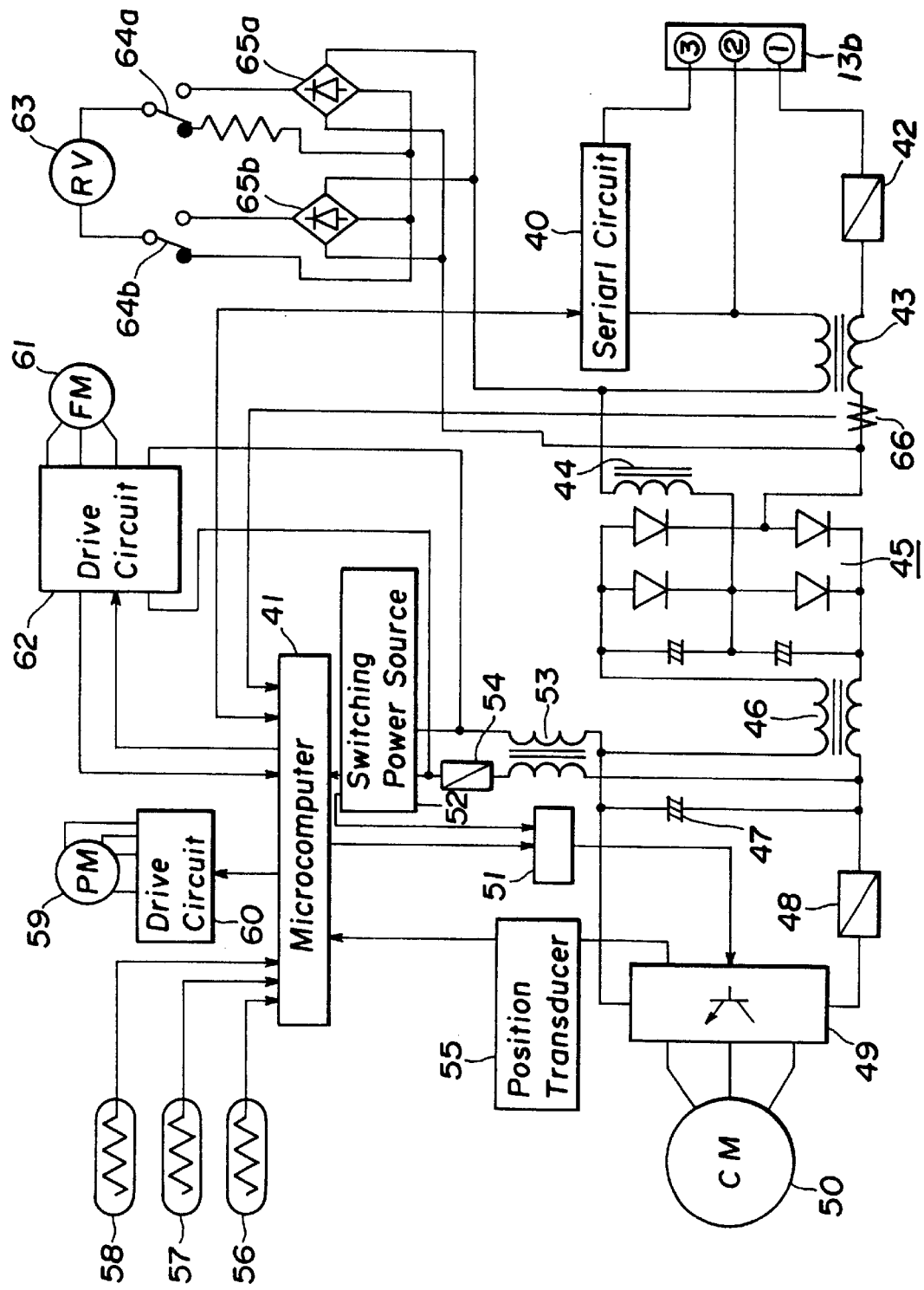
FIG. 4 is a control circuit diagram of the heat source unit 4 of the air conditioner.

FIG. 4 is a control circuit of the heat source unit 4. The AC power of single-phase 100 V, as obtained through the terminals (1) and (2) of the connector 13b, is changed into a DC power of 280 V through a current fuse 42, a noise filter 43 and a choke coil 44 by a voltage doubler rectifier 45 which is composed of four rectifier diodes and two smoothing capacitors. This DC power is fed through a noise filter 46, a smoothing capacitor 47 and a current fuse 48 to a three-phase inverter bridge 49 which is composed of six switching elements (e.g., power controlling switching elements such as power transistors or power FETs).

A refrigerant compressor 50 forms part of the refrigeration cycle for the aforementioned air conditioning. This compressor is equipped with either a three-phase induction electric motor, for example, as its drive source or a three-phase DC brushless electric motor.

When the three-phase induction electric motor is used, the microcomputer 41 feeds the compressor 50 with such three-phase quasi-sine waves as can achieve the value of the voltage/frequency for each frequency set in advance to improve the running efficiency of the compressor 50. Specifically, these quasi-sine waves are produced by turning ON/OFF the six switches of the three-phase inverter bridge 49 on the basis of the magnitudes of the modulated waves and the carriers of the desired frequency. These ON/OFF timings are achieved by the theoretical calculations of the microcomputer 41. Moreover, the frequency of the three-phase AC power to be fed to the compressor 50 is determined according to the frequency of the modulated waves.

A drive circuit 51 or a power amplifier circuit is provided for turning ON/OFF the six switching elements of the three-phase inverter bridge 49 with the output of the microcomputer 41. A switch power source 52 is provided for outputting a constant voltage power for the power source for the drive circuit 51, the power source for the microcomputer 41 and other appliances from the DC power which is obtained through a noise filter 53 and a current fuse 54. The drive circuit 51 can be exemplified by a general purpose constant voltage IC.

When the three-phase DC brushless electric motor is used as the drive source of the compressor 50 (as in the embodiment of FIG. 4), on the other hand, a position transducer 55 detects the position of the rotor of the compressor, and the microcomputer 41 sets the combination of the ON/OFF of the individual switching elements of the three-phase inverter circuit 49 so that a conduction pattern, as matching the rotational position of the rotor, may be achieved.

The position transducer 55 feeds the microcomputer 41 with the output which changed depending upon whether the change in the induced voltage to be induced in the stator wiring by the rotation of the rotor is higher or lower than the voltage corresponding to the neutral point voltage of the three-phase alternating current. The microcomputer 41 calculates the rotational position of the rotor of the compressor on the basis of the changing time of the output of the position transducer 55.

It is then decided which of the six sections (as divided at an interval of 60 degrees) of one rotation (of 360 degrees) the rotational position of the rotor belongs. The individual switching elements of the three-phase inverter circuit 49 are turned ON/OFF so that the three-phase conduction pattern (e.g., the three-phase AC conduction pattern in which the individual phases repeat the conduction of 120 degrees and the inconduction of 60 degrees) corresponding to that section.

The number of revolutions of the compressor 50 is determined by chopping the conduction of 120 degrees, not continuously, but at a predetermined period; and, by changing the chopping ON duty to change the substantial voltage to be applied to the stator winding.

Temperature sensors 56, 57 and 58 are individually constructed of negative characteristic thermistors so that the voltages corresponding to the resistances changing with the temperature may be fed to the A/D input ports of the microcomputer 41. The temperature sensor 56 detects the ambient temperature; the temperature sensor 57 detects the temperature of the compressor 50; and the temperature sensor 58 detects the temperature of the heat source heat exchanger forming the refrigeration cycle. The microcomputer 41 is used for controlling the temperatures, as detected by those temperature sensors.

A stepping motor 59 has about five hundred rotation steps so that it can control a predetermined stroke at five hundred steps. This stroke adjusts the pressure reduction (or expansion) of a pressure reducing unit (or an expansion valve) forming the refrigeration cycle. Moreover, the rotation stepping of this stepping motor 59 is determined with the output of the microcomputer 41 through a drive circuit 60. This control is performed by a method of controlling the rotation step with predetermined characteristics in accordance with the number of revolutions of the compressor or by a method of increasing/decreasing the rotation step so that the evaporation temperature or condensation temperature in the refrigeration cycle may always be constant.

A fan motor 61 is provided for driving the propeller fan which is positioned to blow the air to the heat source heat exchanger. This fan motor 61 is exemplified like the fan motor 61 by a DC brushless motor, and its number of revolutions is controlled by the microcomputer 41 through a drive circuit 62.

A refrigerant passage change-over valve 63 is provided for switching the flow of the refrigerant so as to effect a cooling mode, in which the user heat exchanger in the refrigeration cycle can act as an evaporator, and a heating mode in which the user heat exchanger can actor as a condenser. This change-over valve is usually exemplified by a four-way valve.

Switch members 64a, 64b are individually switched by the output of the microcomputer 41 through power relays. FIG. 4 shows the state, in which the power relay is OFF.

When the switch member 64a is switched to the side of a diode bridge 65a, the current flows from the switch member 64a to the switch member 64b so that the refrigerant passage change-over valve 63 is switched to one side. When the switch member 64b is switched to a diode bridge 65b, on the other hand, the current flows from the switch member 64b to the switch member 64a so that the refrigerant passage change-over valve 63 is switched to the other side. Since this refrigerant passage change-over valve 63 has a self-holding function to hold its state once it is switched, it may be energized in a predetermined direction for a predetermined time period when the refrigerant passage is to be switched. This self-holding function of the passage is retained by repeating the energization at a predetermined interval.

A current transformer 66 is mounted in a position to meter the current consumed in the heat source unit 4. The current waveform, as outputted from this current transformer, is directly subjected to an A/D conversion at its instant value for every predetermined time period until it is fetched by the microcomputer 41. This microcomputer 41 calculates an effective value from the current waveform represented by a series of values digitized for every predetermined time period to perform control of current.

This current control is to control the refrigerating ability of the air conditioner, i.e., the number of revolutions of the compressor 50 so that the current to be consumed by the heat source unit may not exceed a set value. This number of revolutions of the compressor 50 is determined on the basis of the change in the refrigerating ability for the present refrigerating ability, as obtained in the user unit 3 by the fuzzy operation which is tuned to bring the room temperature to a set level by inputting the difference between the room temperature and the set temperature and the change in the difference. This change is sent from the user unit 3 through the serial circuit.

The setting of the number of revolutions of the compressor 50 is replaced by the number of revolutions which is prepared by adding the change to the present number of revolutions and by correcting the sum. In order that the compressor 50 may take that number of revolutions, the microcomputer 41 turns ON/OFF the individual switching elements of the three-phase inverter circuit 49. A predetermined number of revolutions is set as the initial value at the start of the compressor 50.

Here, the aforementioned correction is made, as the consumed power approaches the set value, sequentially in the range having no correction, in the range having no rise in the number of revolutions, and in the range of lowering the number of revolutions, so that the current to the compressor 50, i.e., the current to the heat source unit may, not exceed the set value. When the current the set value, it is decided that the air conditioner is in an abnormal state. Then, the air conditioner is stopped, and this trouble is indicated.

By changing this set value, therefore, the current to the air conditioner can be substantially restricted. This set value is made with the signal coming from the user unit to take values 20A, 17A, 15A and 10A in the air conditioner for general homes.

This set value can also be changed at an interval of 1A in response to the change signal coming from the later-described system interconnection generator 2 when the signal sent from the remote controller is set through the user unit 3 to validate the demand function.

Figure 5:
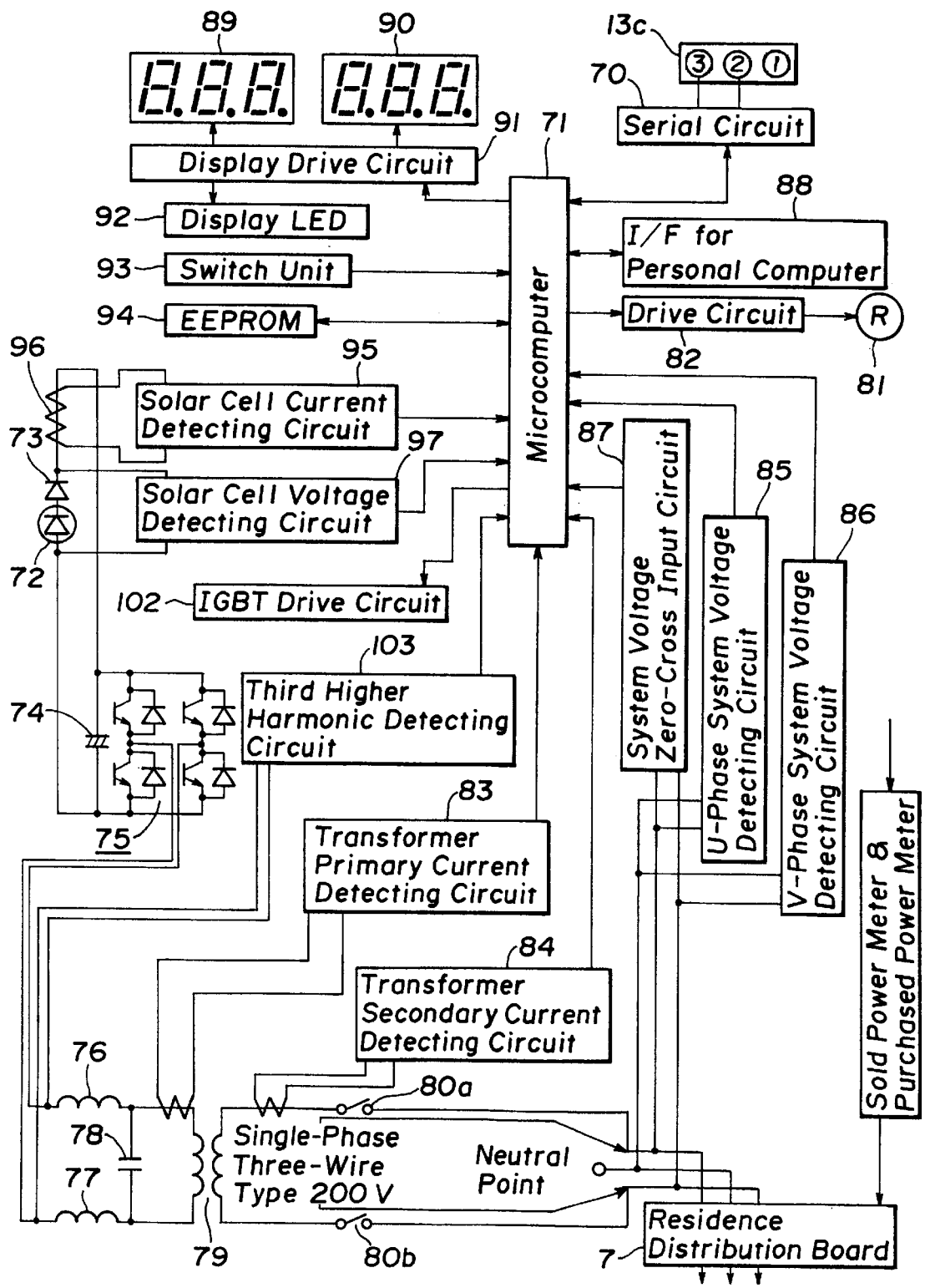
FIG. 5 is a control circuit diagram of the system interconnection generator.

FIG. 5 shows a control circuit of the system interconnection generator 2, which is constructed to transfer the signals among the microcomputer 71, the microcomputer 17 and the microcomputer 41 through the serial circuit 70. In this circuit, a solar cell 72 is provided for converting the solar energy into electric power so that the generated output is stored in a capacitor 74 through a protective diode 73.

A single-phase inverter circuit 75 is provided in which four switching elements (e.g., power switching elements such as IGBT) are bridged so that they are turned ON/OFF in a predetermined pattern to produce quasi-sine waves of single-phase 100 V at 50 Hz (or 60 Hz). These quasi-sine waves are boosted to an AC power of single-phase of 200 V+α (wherein α: a voltage necessary for a flow toward the system) at 50 Hz by a booster transformer 79 through a low-pass filter which is composed of coils 76 and 77 and a capacitor 78. This AC power is fed to the power line of the system through the residence distribution board 7, as shown in FIG. 1.

Normally open contacts 80a, 80b are associated with each other and closed when a power relay 81 is turned ON. This power relay 81 is turned ON/OFF through a drive circuit (or power amplifier) 82 by the microcomputer 71 (e.g., U83C196MH of Intel Corporation). This microcomputer 71 opens the normally open contacts 80a and 80b to isolate the system interconnection generator from the system when it decides that the solar cell 72 is not active or when it detects some trouble.

A transformer primary current detecting circuit 83 detects the current flow to the primary side of the booster transformer 79, i.e., to the solar cell 72. This current is outputted in an AC waveform by the C.T. and is fed as it is to the A/D conversion ports of the microcomputer 71. This microcomputer 71 subjects this waveform to the A/D conversion for every predetermined time period (e.g., every 200 microseconds) and inputs a current instantaneous value for each lapse of time for the control.

In this control, first of all, the digital current value is compared by the microcomputer 71 with the current value in phase of the ideal current waveform data (having a current waveform of sine waves), as stored as table data in a memory unit (ROM), to make a correction for increasing or lowering the voltage in the same phase in the subsequent period so that the waveform of the output current is brought close to the ideal current waveform to suppress the waveform distortion of the output current.

The table data of the ideal current waveform are sampled for 50 Hz at 200 microseconds so that 100 data=20 milliseconds/200 microseconds, and 84 data for 60 Hz.

On the other hand, the ideal waveform data can be calculated on the basis of predetermined reference data by multiplying the reference data by a predetermined ratio for effective values of the necessary current.

A transformer secondary current detecting circuit 84 detects the current flow to the secondary side of the booster transformer 79, i.e., to the system. This circuit feeds the waveform of the current, as detected in the C.T., through a full-wave rectifier (e.g., a circuit using a general purpose IC such as LA6324 made by Sanyo Electric Co., Ltd.) to an effective value operating IC (e.g., NJM4200 made by Shin Nihon Musen Co., Ltd.). This IC converts the effective value of the current, as detected by the C.T., into a voltage change and feeds this voltage change to the A/D input port of the microcomputer 71. This microcomputer 71 determines the effective value of the current from that voltage to determine and display the output power value of the system interconnection generator in the display unit.

A U-phase system voltage detecting circuit 85 and a V-phase system voltage detecting circuit 86 are provided for stopping the power supply to the system when the voltage to be outputted to the system fluctuates more than a predetermined value. These circuits detect a voltage between a neutral point and a U-phase and a voltage between the neutral point and a V-phase from the AC power of single-phase three-line 200 V, as outputted from the system interconnection. generator. These detecting circuits are identical and commonly use the electric circuit shown in FIG. 6.

Figure 6:
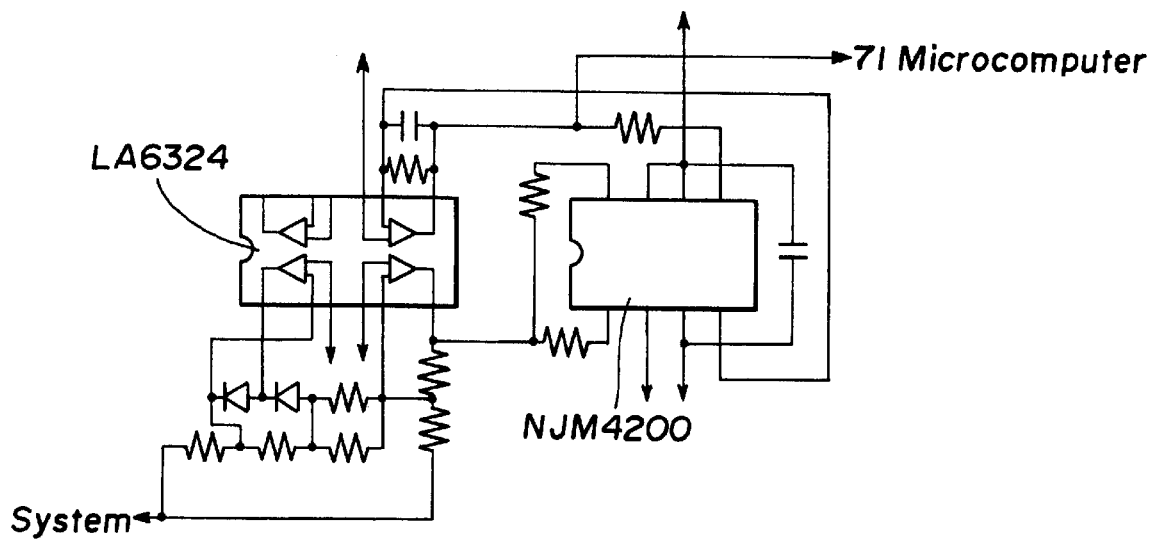
FIG. 6 is an electric circuit diagram of the U-phase system voltage detecting circuit and the V-phase system voltage detecting circuit.

In FIG. 6, the change in the inter-terminal voltage, as obtained from the system, is fed to an effective value calculating NJM4200 through an IC (LA6324) composing a full-wave rectifier so that a DC voltage corresponding to the effective value is fed to the A/D conversion input port of the microcomputer 71. This microcomputer 71 is used to control the digital effective value of the voltage.

A system voltage zero-cross input circuit 87 is provided for outputting its signal to the microcomputer 71 when a zero-cross signal of the system (or the AC power) is decided.

Figure 7:
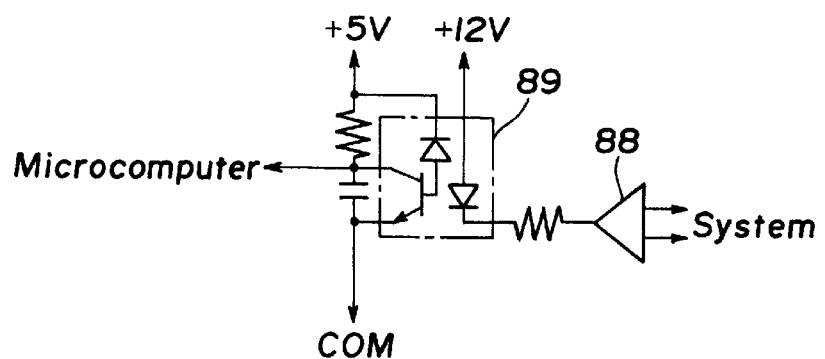
FIG. 7 is an electric circuit diagram of the system voltage zero-cross input circuit.

FIG. 7 shows a system voltage zero-cross input circuit, the output of which is inverted when the voltage of the system applied to a comparator 88 is inverted. The output of this comparator 88 is fed to a photocoupler 89 for noise elimination, voltage transformation and electric insulator, before entering the microcomputer 71. In terms of the change in this output, the microcomputer 71 decides the zero-cross of the system to control the output timing of the ON/OFF signals of the switching elements so that the zero-cross of the AC power to be outputted from the single-phase inverter circuit 75 may become identical to that of the system, and provides a reference time for adjusting the phase of the voltage correction so as to achieve the aforementioned ideal current waveforms.

Reverting to FIG. 5, reference numeral 88 designates a personal computer I/F (i.e., interface) or an interface circuit for connecting signal lines with an external personal computer. This circuit is used for communications according to predetermined standards (e.g., RS-232C) and is constructed of a general purpose IC such as MAX232 for communications of RS-232C. Thus, the personal computer of the system interconnection generator can be controlled from the outside by using that personal computer I/F 88.

Display units 89, 90 are combined in three figures of displays of eight segments to display the generated power of the solar cell 72, the codes indicating the kinds of troubles, if any, and the set guide line values at the initial setting. These display units 89 and 90 are fed with the output signals from the microcomputer 71, as amplified in power by a display drive circuit (e.g., a general purpose driver IC) 91 so that they are dynamically lit by the signals.

Numeral 92 designates a display LED to be dynamically lit with the output signal of the microcomputer 71 through the display drive circuit 91. This display includes a green running display indicating the run of the system interconnection generator, the green display indicating the ON/OFF states of the normally open contacts 80a and 80b which are opened at an abnormal time, the red display indicating when a trouble occurs, and the yellow display indicating the state in which the generated power of the solar cell is not sufficient.

A switch unit 93 is provided such as a push switch connected in a matrix shape with the input/output ports of the microcomputer 71 or a lock type push switch, the state of which is fetched for controls by the scanning of the microcomputer 71. This switch functions to validate the change mode of the set value, to erase the data indicating the history of the stored abnormalities, and to run/stop the system interconnection generator.

An EEPROM or a memory 94 is provided for storing the set values or the history of abnormalities. The set values are provided for individually setting the reference values to decide abnormalities different for the systems.

A solar cell current detecting circuit 95 detects the amount of current, as outputted from the solar cell 72, to output the current amount to the microcomputer 71.

Figure 8:
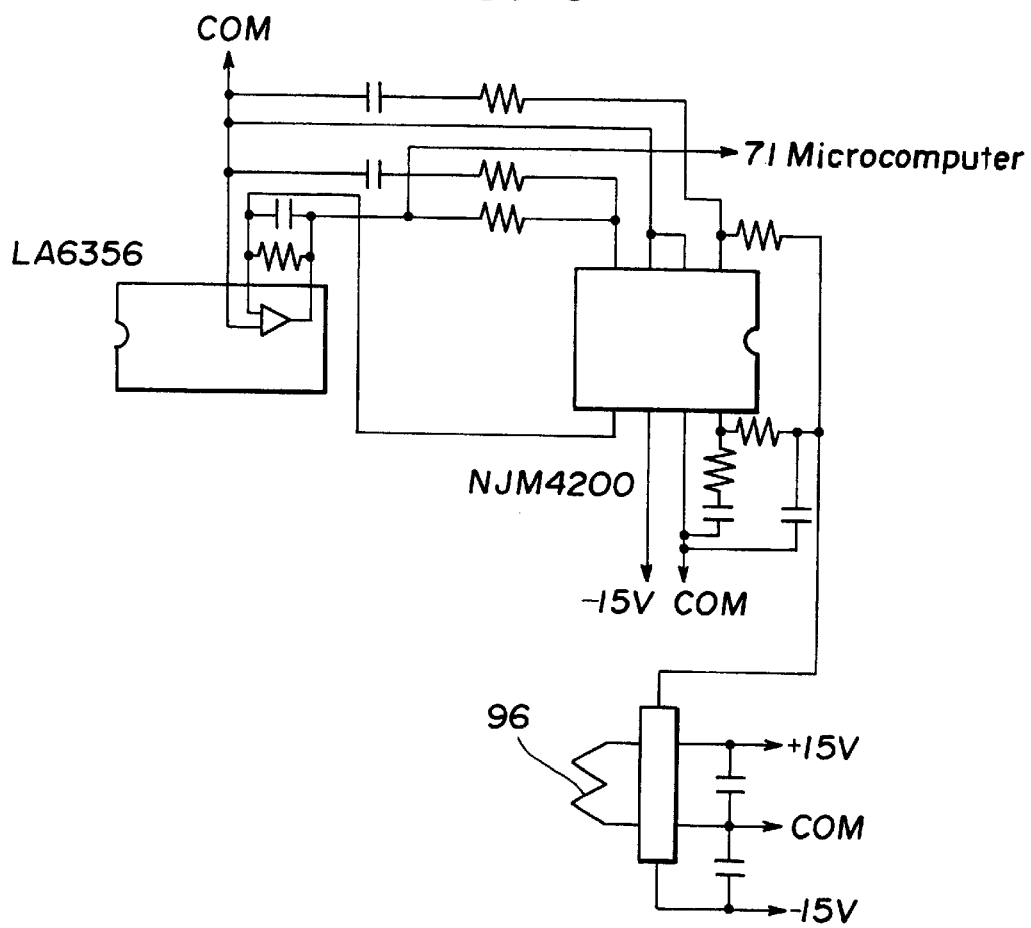
FIG. 8 is an electric circuit diagram of the solar cell current detecting circuit.

FIG. 8 is an electric circuit diagram of the solar cell current detecting circuit 95. Numeral 96 designates a DCCT (i.e., a DC current detecting transformer) for outputting a voltage according to the current, as outputted from the solar cell 72. This output is fed to the effective value calculating IC (e.g., NJM4200) so that a voltage corresponding to the effective value of the current is obtained by the IC. The effective value is computed to produce the accurate current value because the output current of the solar cell 72 is not a complete direct current but contains a pulsating current. The microcomputer 71 fetches this voltage from the A/D input port and stores the current value corresponding to the voltage in a predetermined memory position thereby to use the current value for the controls.

Figure 9:
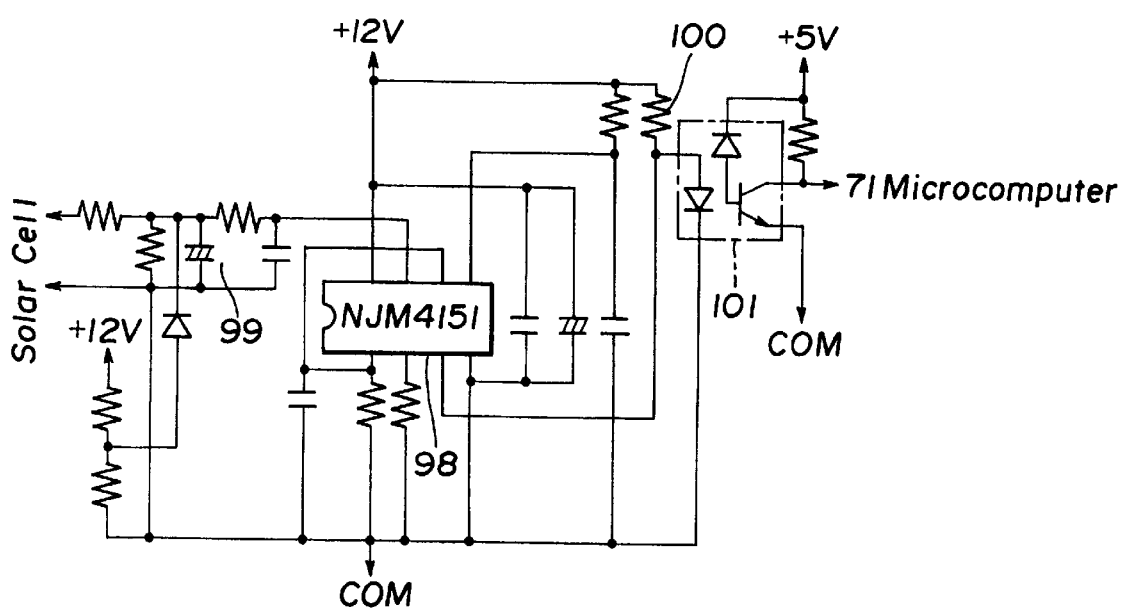
FIG. 9 is an electric circuit diagram of the solar cell voltage detecting circuit.

A solar cell voltage detecting circuit 97 detects the inter-terminal voltage of the solar cell 72 and outputs the detected voltage to the microcomputer 71. FIG. 9 is an electric circuit diagram of the solar cell voltage detecting circuit. Numeral 98 designates a V/F (i.e., voltage/frequency) converting IC (e.g., NJM4151 made by Shin Nihon Musen Co., Ltd.).

The inter-terminal voltage of the solar cell 72 is divided and raised by a resistor to a predetermined level and is stabilized by a capacitor 99 so that this stabilized voltage is applied to the voltage input terminal of the V/F converting IC 98. This IC oscillates with a frequency corresponding to the applied voltage and feeds the oscillatory outputs to the light emitting element of a photocoupler 101 by using an output resistor 100. The output of the photocoupler 101 is fed to the microcomputer 71, which meters the frequency output of the output to determine the corresponding voltage.

An IGBT drive circuit 102 is provided for driving the switching elements (e.g., IGBTs in the present embodiment, or transistor drive circuits and FET drive circuits when the power transistors or power FETs are used), as composing the single-phase inverter 75. Specifically, this is a drive circuit for amplifying the power of the ON/OFF signal, as outputted from the microcomputer 71, to a level as high as to drive the IGBTs, and is composed of a photocoupler and an amplifier, as can be exemplified by a general purpose drive circuit.

A third harmonic detecting circuit 103 detects the troubles such as the service interruption or disconnection of the system in terms of the increase in the third harmonic to cut off the connection to the system interconnection generator. This detecting circuit is composed of a band-pass filter, a V/F (i.e., voltage/frequency) converting circuit and so on (as disclosed in copending Japanese Patent Application No. 7-146599/1995). The system interconnection generator thus constructed converts the generated output of the solar cell 72 into the single-phase Ac power of 100 V having quasi-sine waves of 50 Hz or 60 Hz by the single-phase inverter circuit 75 if the voltage, as detected by the solar cell voltage detecting circuit 97, is over a predetermined voltage (to extract the generated power). This single-phase AC power is converted into the single-phase AC power of 200 V by the booster transformer 79 and fed to the system if the normally open contacts 80a and 80b are closed. As a matter of fact, the converted single-phase AC power is set to a level slightly higher than 200 V for a flow toward the system, but the value of 200 V will be assumed in the following description.

At this time, the generated power of the solar cell is dynamically displayed in the display unit 89 by the microcomputer 71.

Figure 10:
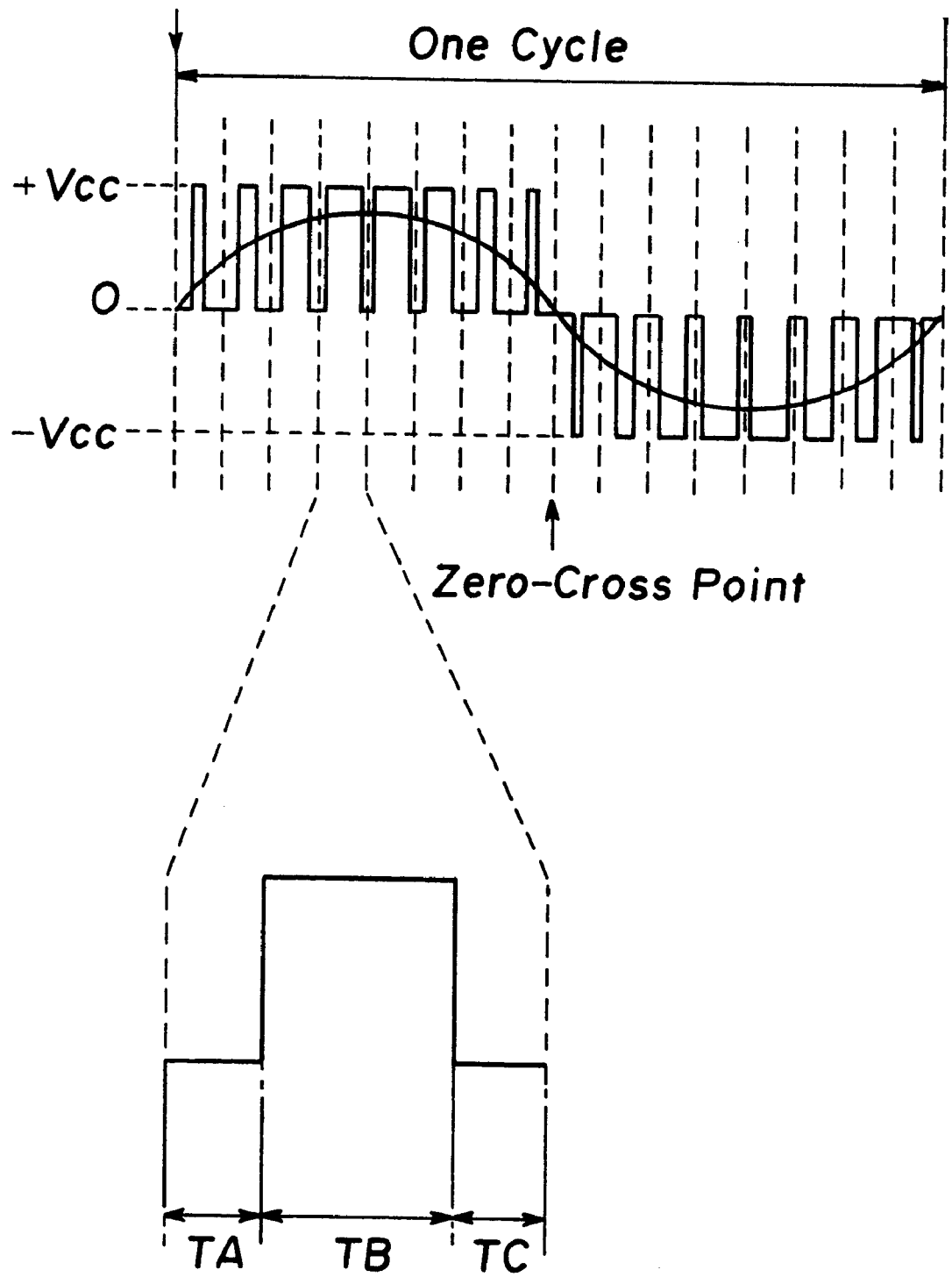
FIG. 10 is an explanatory view which illustrates a quasi-sine wave to be outputted from the single-phase inverter circuit.

FIG. 10 is an explanatory diagram illustrating the quasi-sine waves (indicating the current waves), as outputted from the single-phase inverter circuit 75. In FIG. 10, one cycle or period is divided into sixteen sections (e.g., section 1 to section 16) so as to facilitate the description. As a matter of fact, in the case of 50 Hz, 100 divisions=20 milliseconds/200 microseconds for one period of 20 milliseconds and a sampling period of 200 microseconds. In the case of 60 Hz, there are obtained eighty four divisions.

The one period is started in synchronism with the zero-cross signal which is outputted from the system voltage zero-cross input circuit 87 so that the sixteen divided waveforms are outputted sequentially from the instant when the zero-cross signal is obtained. Letters Vcc designate the inter-terminal voltage of the smoothing capacitor 74.

Moreover, since the zero-cross signal is outputted twice every 180 degrees for one period, the divided eight sections (i.e., the section 1 to the section 8) of half period may be one cycle. At this, the next half period is the inverted outputs of the aforementioned eight sections (i.e., the section 1 to the second 8).

The three potential positions (at Vcc, 0 and −Vcc) of this waveform can be obtained by selecting the combination of the ON/OFF of the switching elements of the single-phase inverter circuit 75. As a result, the quasi-sine waves are obtained by changing the combination of the ON/OFF sequentially.

One (e.g., the fourth section 4 from the zero-cross position) of the sixteen sections is constructed of three sections TA, TB and TC, of which the sections TA and TC have equal periods.

For the individual sections (1 to 16), therefore, the data table having the corresponding frequencies F (e.g., 50 Hz and 60 Hz) and TB values is stored in the memory unit so that the selected combination of the ON/OFF may be maintained for the values (or time periods) for every set section. The TA and TC values are (100 microseconds−TB)/2.

Figure 11:
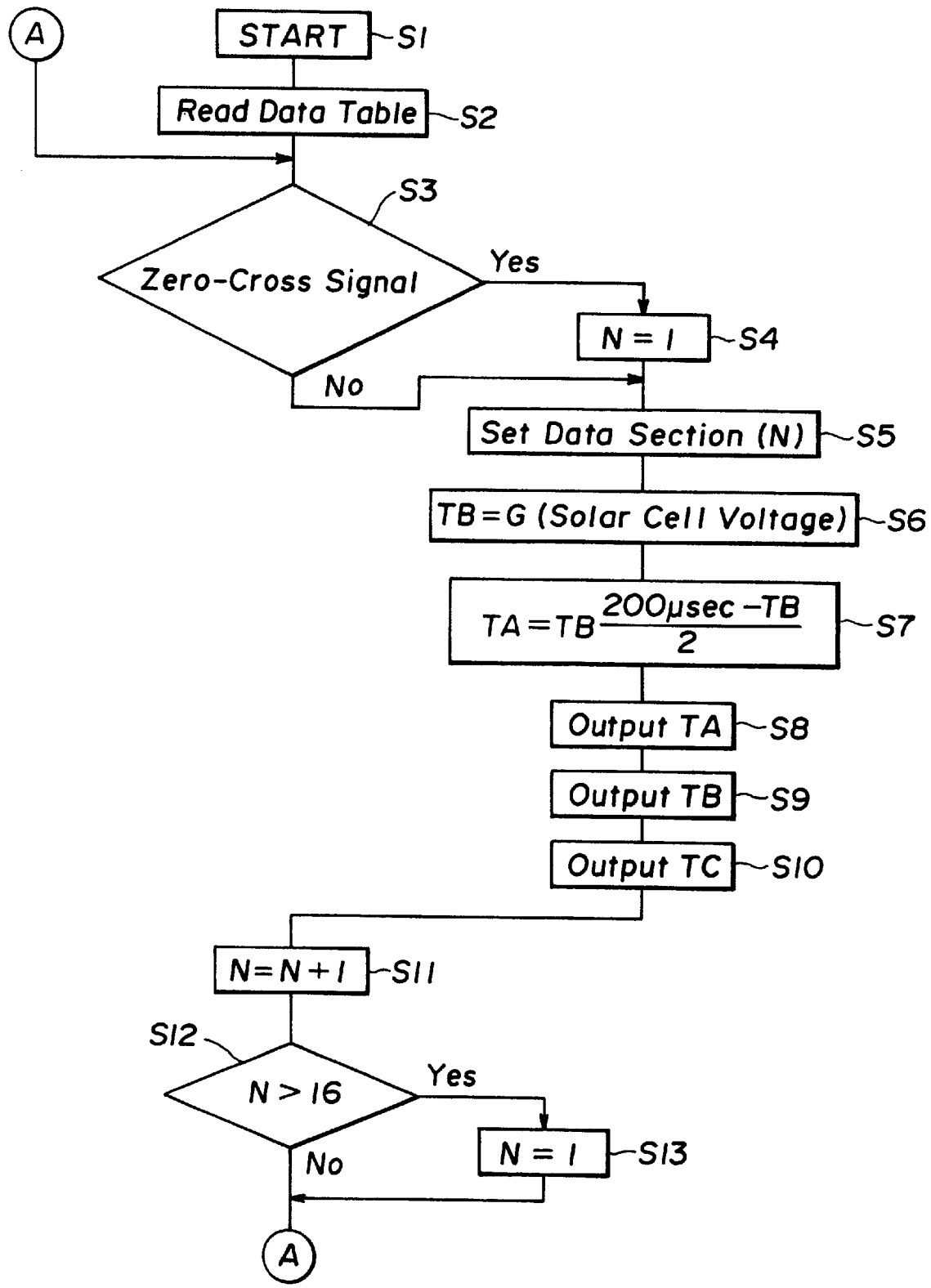
FIG. 11 is a flow chart for generating the waveform of the quasi-sine wave.

FIG. 11 is a flow chart for generating the waveforms of the quasi-sine waves. In this flow chart, at Step S1, a variety of initial settings are made, and the microcomputer 71 starts its operations. At next Step S2, the data for the necessary frequency are read out from the data table, as stored in the ROM 94, to prepare a new data table.

Next, at Step S3, it is decided whether or not there is an output from the system voltage zero-cross input circuit 87. If this answer is YES, the routine advances to Step S4, at which N=1, and then to Step S5. If it is decided at Step S3 that the zero-cross signal is not detected, the routine advances as it is to Step S5. Since the decision of the zero-cross signal is processed by the interruption of the microcomputer 71, Step S3 is processed any time if the zero-cross signal is produced.

A Step S5, the data of the TB of the section, as designated with a variable N, are read out from the new table. Next, at Step S6, the data of the TB are corrected according to the format which is so predetermined for the generated voltage of the solar cell as to produce the quasi-sine wave current value set for the solar cell to generate the power at the optimum point.

At Step S7, the values of the TA and TC are calculated from the corrected value of the TB. Next, at Steps S8, S9 and S10, the predetermined combination of the ON/OFF signals is maintained. As a result, there is produced a waveform of one section, as illustrated in FIG. 10.

At Steps S8 to S10, a timer for producing an interruption signal at a time-up is used for measuring the time periods for maintaining the predetermined ON/OFF combination so that the microcomputer 71 is allowed to perform other controls during the measurement of the timer, that is, before the interruption signal appears.

Next, at Step S11, N=N+1, and the counter is proceeded to the next section. If N>16 at Step S12, the section to be established at Step S13 as "N=1" is returned to the head.

Next, the routine advances to Step S3, at which a series of quasi-sine waves are produced.

Figure 12:
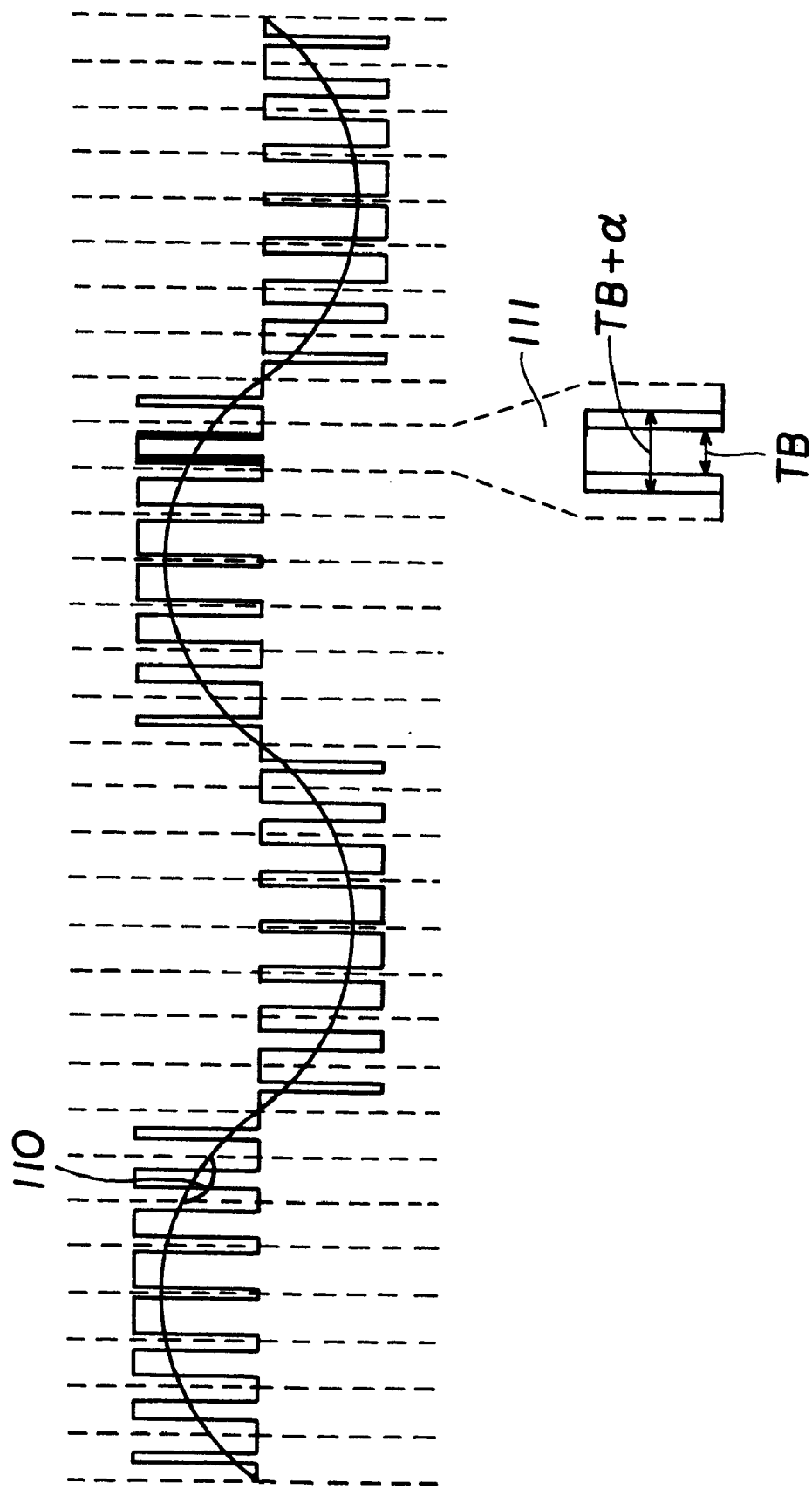
FIG. 12 is an explanatory diagram illustrating the waveform of two periods of the quasi-sine wave.

FIG. 12 illustrates a waveform of two periods of the quasi-sine wave thus generated. In FIG. 12, numeral 110 designates a distorted portion of the current waveform, as distorted by the induction load of the electric parts against the theoretical quasi-sine wave. This distortion is decided by comparing the instantaneous value of the current, as obtained through the transformer primary current detecting circuit 83, and the theoretical current value.

This distortion is corrected at the next period by correcting the value of the TB which constructs the same section (as indicated by numeral 111) of the next period. Specifically, the distorted portion 110 of the measured current waveform is low for the theoretical current value so that the value of the TB is corrected in the section 111 to "TB=TB+α" (wherein a takes α positive value). Incidentally, the value α may be negative when the distorted portion 110 of the measured current waveform is high for the theoretical current value. This correction is executed for all the sections in which the measured current value is different from the theoretical value, so that the value of the next period is always sequentially corrected for every period.

This repetition can be effected by replacing the corrected value of the TB by the value of the data which are read in by the "Read Data Table" at Step S2 of the flow chart presented in FIG. 11.

Figure 13:
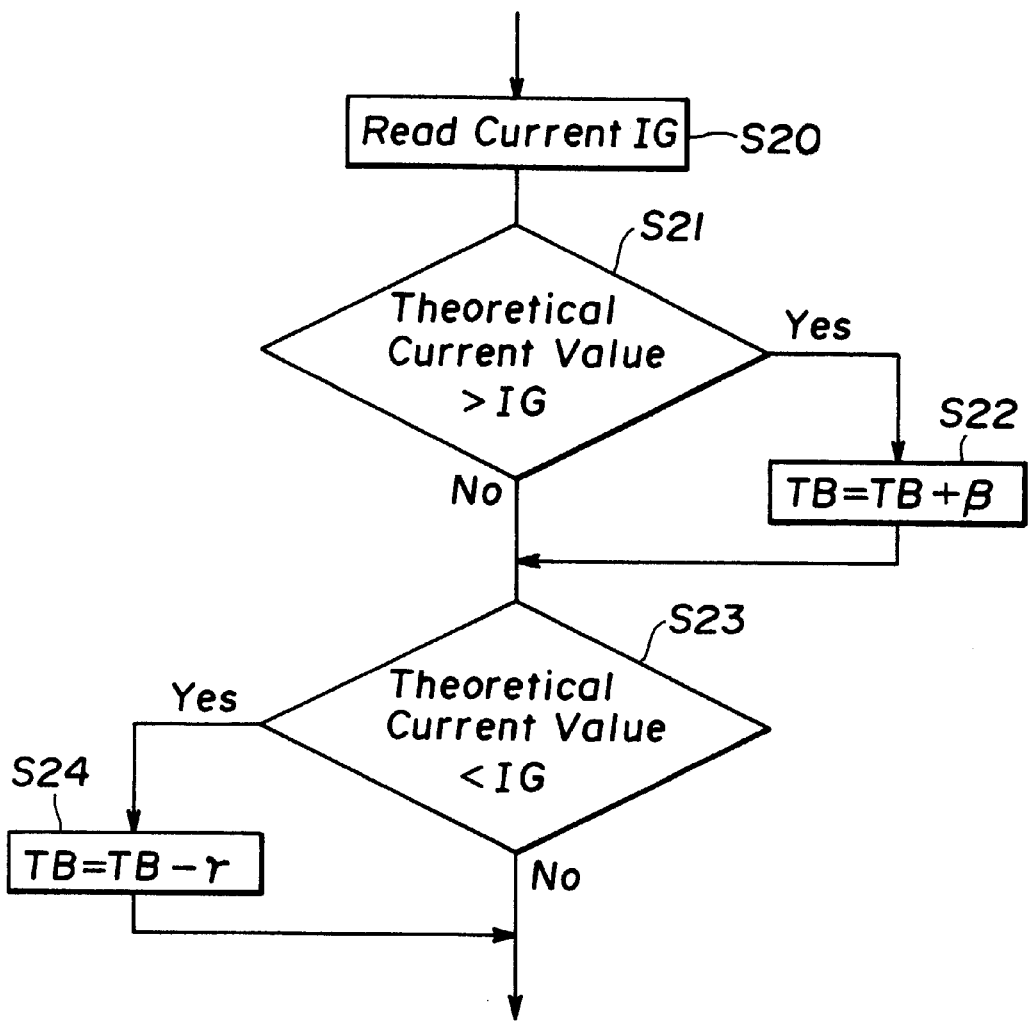
FIG. 13 is a flow chart showing the operations for correcting the current waveform.

FIG. 13 is a flow chart showing the operations, which are performed in parallel while the operations of Steps S8, S9 and S10 of the flow chart of FIG. 11 are being executed. These operations may be executed at the change in the sections if the processing speed of the microcomputer 71 allows.

First of all, at Step S20, the current IG, as detected by the transformer primary current detecting circuit 83, is read in. This current may take the value of the target section which has already been read.

At Steps S21 and S23, this current value IG is compared in its value with the theoretical current value of the quasi-sine wave which is set so that the solar cell may generate the power at its optimum operating point. If "Theoretical Current Value>IG", the value of the TB of the data table of the corresponding section is corrected at Step S22 to "TB=TB+β" and then updated. If "Theoretical Current Value<IG", the value of the TB of the data table of the corresponding section is corrected at Step s24 to "TB=TB−γ" and then updated. These values β and γ are suitably set according to the maximum output of the solar cell 72, and β=γ. In order to reduce the current fluctuation width, moreover, these β and γ values are set such that the current IG reaches the theoretical current value after several corrections.

By these corrections for the individual sections of the quasi-sine wave, the solar cell is enabled to generate in an optimum state at all times, and the distortion of the current waveform of the quasi-sine wave can be substantially eliminated to feed an AC power of stable waveform to the system.

In the foregoing embodiment, the value of the data table is corrected at first in accordance with the distortion of the current waveform and then for achieving the optimum operations of the solar cell. However, the corrections may be made at first for the optimum operations of the solar cell and then for the distortion of the current waveform. In this modification, there may be separately provided a data table for correcting the distortion of the current waveform, and this table may be updated for each period so that this corrected value may be added to the correction for the optimum operations of the solar cell.

Moreover, the microcomputer 71 can determine the generated power of the solar cell 72 from both the current value detected by the solar cell current detecting circuit 95 and the voltage value detected by the solar cell voltage detecting circuit 97, to output the signal (e.g., demand signal) for controlling the run of a corresponding load from the integrated power and the consumed power of the load.

At first, the integrated value of the generated power of the solar cell 72 is stored in the memory unit. Next, there is determined the power consumed in the heat source unit 4 of the air conditioner (or the characteristic load) through the serial circuit 70. This consumed power value is the integral of the current value, as used for the current control by the heat source unit 4, and corresponds substantially to the consumed power of the load (or the air conditioner).

Next, according to the value of the integrated power after the consumed power value has been subtracted from the value of the integrated power, the demand signal is sent through the serial circuit 70 to the heat source unit 4 to regulate the drivability of the air conditioner. This demand signal is released when the integrated power value is sufficiently restored.

Figure 14:
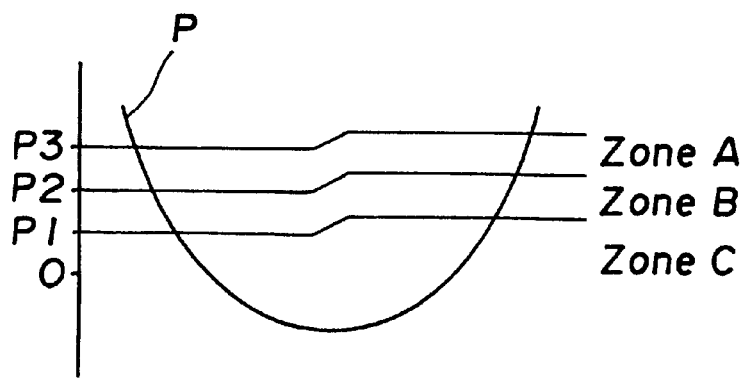
FIG. 14 is an explanatory diagram illustrating the relation between the change in the integrated value of the generated power of the solar cell and the demand.

FIG. 14 is an explanatory diagram illustrating the aforementioned relation. In FIG. 14: reference character P indicates the integrated value of the power generated by the solar cell 72; P3 indicates the value corresponding to the power to be consumed for three days by the load (or the air conditioner); P2 indicates the value corresponding to the power to be consumed for two days by the load (or the air conditioner); and P1 indicates the value corresponding to the power to be consumed for one day by the load (or the air conditioner). These values are suitably set according to the drivability of the air conditioner and the maximum power generated by the solar cell.

Zone A to zone C are set by using P3, P2 and P1, as shown in FIG. 14. Moreover, differentials are suitably set according to the fall and rise of the integrated value P.

In the zone A, the demand signal for changing the maximum running current to ⅔ of the set value is sent to the heat source unit 4; in the zone B, the demand signal for changing the maximum running current to ½ of the set value is sent to the heat source unit 4; and in the zone C, the demand signal for changing the maximum running current to ⅓ of the set value is sent to the heat source unit 4. The demand is released when the integrated value does not belong to any zone. These signals effectively act when the demand function of the air conditioner is effectively set.

By these controls, the power consumption of the air conditioner can be suppressed within the power generated by the solar cell if averaged for one year. Specifically, the generated power of the days, for which no run of the air conditioner is required, and the excess powers at the running time with a low power are integrated, and the integrated power is used when the air conditioning is necessary, so that the power consumption of the air conditioner can be suppressed within the generated power of the solar cell.

In short, the integrated value corresponds to the amount sold, so that the air conditioning is substantially free of required running cost by operating within the sold power. In other words, the system can be utilized as a power accumulator to raise the using percentage of the solar cell substantially to 100% by selling the power.

Figure 15:
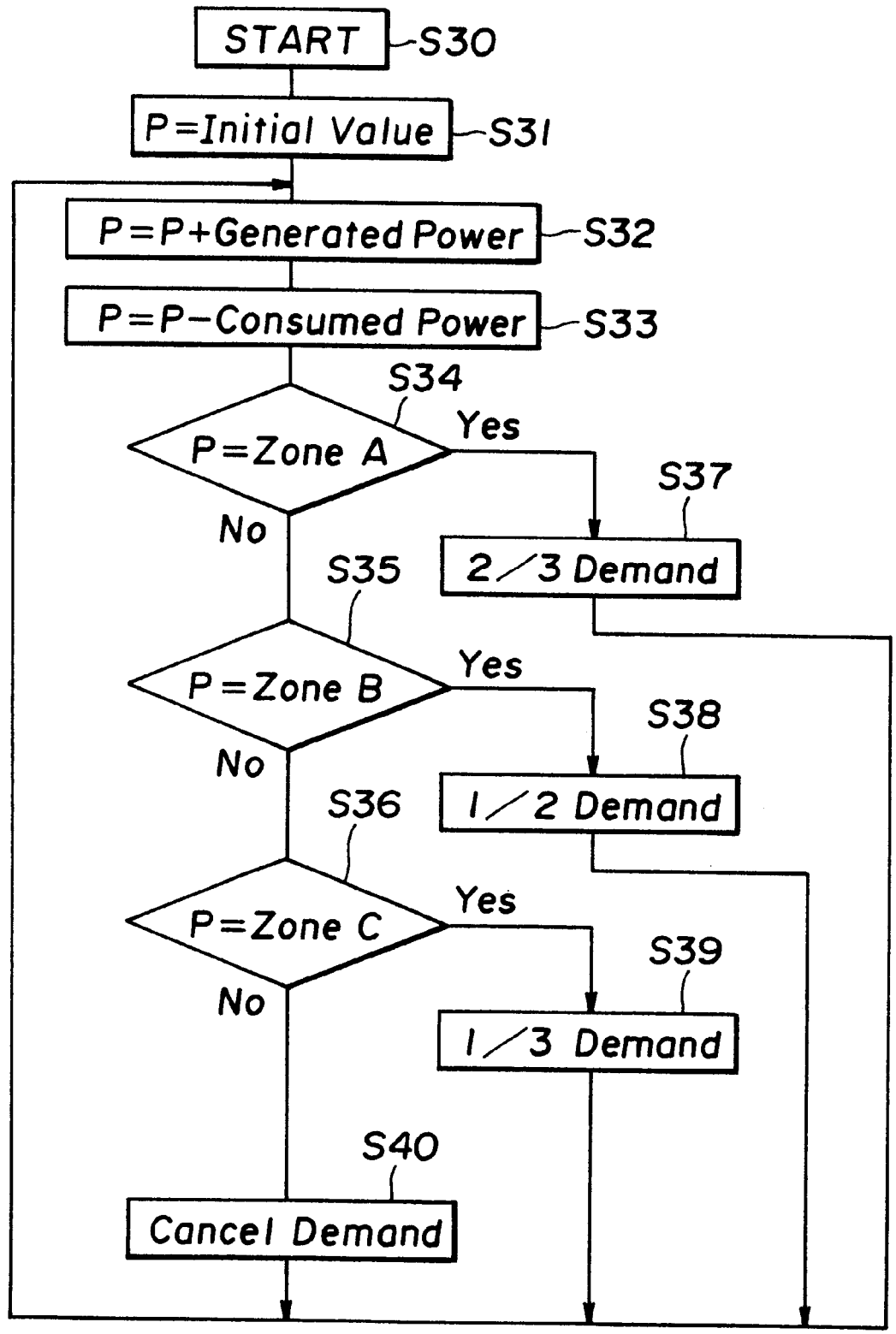
FIG. 15 is a flow chart for the demand control.

FIG. 15 is a flow chart for these operations (i.e., the demand controls). At first Step S30, the system interconnection generator starts its run. Then, the initial value is set at Step S31 to the integrated value P. This initial value can be selected by the switch to include a value corresponding to the power consumption of the air conditioner for ten days, a value corresponding to the power consumption of the air conditioner for seven days, a value corresponding to the power consumption of the air conditioner for five days, and a value corresponding to the power consumption of the air conditioner for three days, so that one of these values is suitably selected according to the season in which the system tie generator is installed (to start its run). It is preferable to set the initial value at a high value in summer or winter for a higher power consumption and at a low value in an intermediate season such as spring or autumn. However, the initial value may be set at a constant value throughout seasons.

At Step S32, the power, as generated by the solar cell, is added to the integrated value, and at Step S33, the power, as consumed in the air conditioner, is subtracted from the integrated value P thereby to determine the integrated value to be used for the control.

At Steps S34 to S36, it is decided which of the zones A to C the integrated value P belongs to. If the integrated value P belongs to the zone A, the routine advances to Step S37, at which the demand signal for changing the set value of the current control into ⅔ is outputted to the heat source unit 4 of the air conditioner. If the integrated value P belongs to the zone B, the routine advances to Step S38, at which the demand signal for changing the set value of the current control into ½ is outputted to the heat source unit 4 of the air conditioner. If the integrated value P belongs to the zone C, the routine advances to Step S39, at which the demand signal for changing the set value of the current control into ⅓ is outputted to the heat source unit 4 of the air conditioner. If the integrated value P does not belongs to any of the zones A to C, the routine advances to Step S40, at which a signal for returning the set value of the current control is outputted to the heat source unit 4 of the air conditioner.

Figure 16:
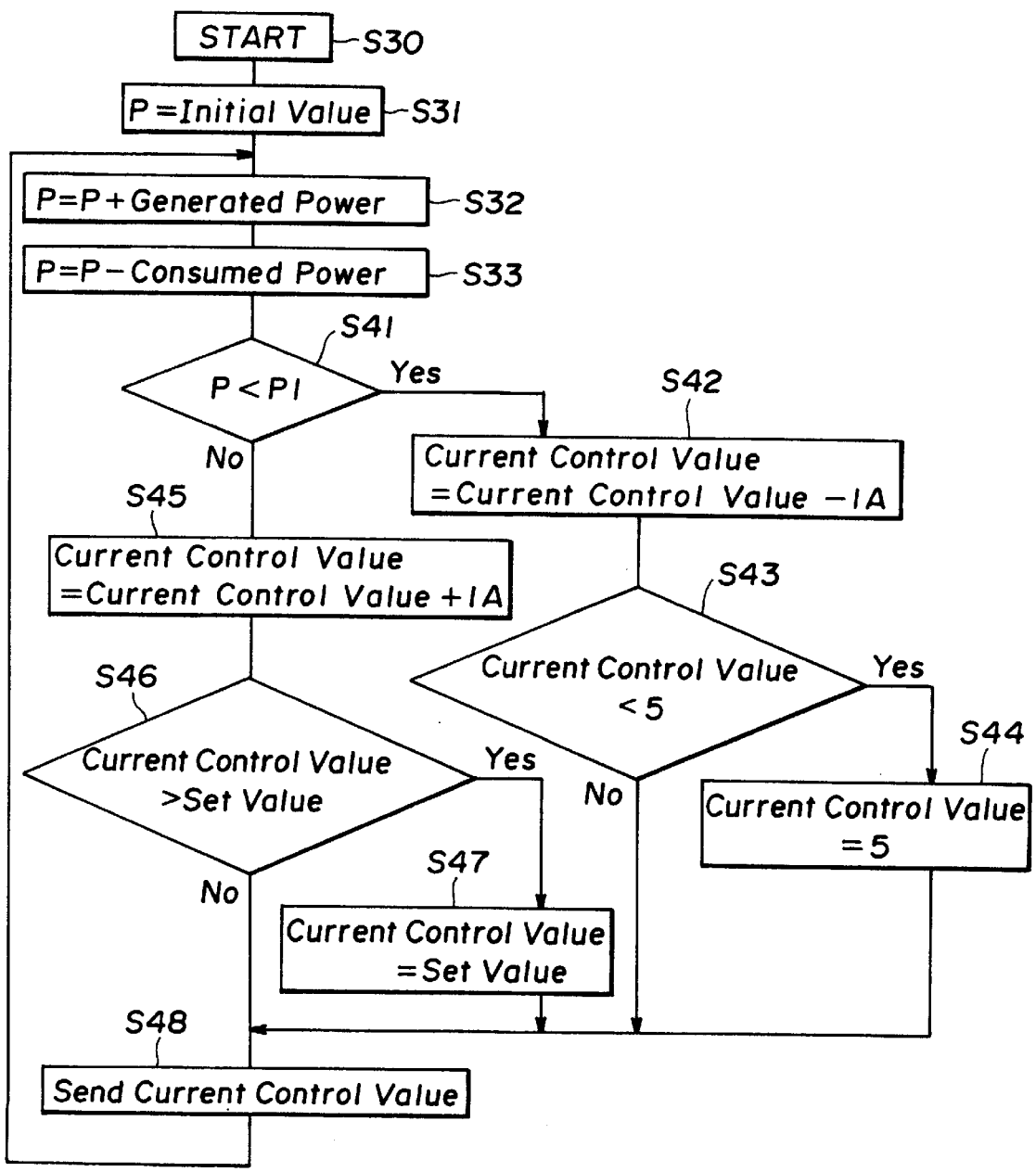
FIG. 16 is a flow chart showing another embodiment.

FIG. 16 is a flow chart showing another embodiment. In this embodiment, the set value of the current control is changed depending upon whether or not the integrated value P exceeds P1.

Here will be omitted the description of the same operations as those of the flow chart, as shown in FIG. 15, by giving the same step numerals. First of all, at Step S41, it is decided whether or not the integrated value P exceeds the value P1. If "P<P1", at Step S42, the current set value is renewed by the value which is calculated by subtracting 1A from the current controlling current set value, as obtained from the heat source unit 4. If, at this time, it is decided at Step S43 that "Current Control Value<5", at Step S44, "Current Control Value=5 A" so that the current control valve may not be lower than 5 A. This lower limit is arbitrarily set to a proper value.

If it is not satisfied at S41 that "P<P1", the current set value is renewed by the value which is calculated by adding 1 A to the current controlling current set value, as obtained from the heat source unit 4. If, at this time, it is decided at Step S46 that "Current Control Value>Set Value" (wherein the set value is the current control value, as initially set in the heat source unit, namely, the value set in the user unit 3), "Current Control Value=Set Value" at Step S47 so that the current control value may not exceed the set value.

At Step S48, the current control value thus set is sent to the heat source unit 4 to control the drivability of the heat source unit 4.

On the other hand, only the decision result of Step S41 may be sent to the heat source unit 4 to entrust the functions corresponding to Steps S42 to S47 upon the heat source unit 4. At this time, the heat source unit 4 has to cope with these functions. Although the description thus far made is directed to the interactions between the system interconnection generator and the air conditioner, the present invention should not be limited thereto but can be applied to various appliances having the demand function.

Hence, the system interconnection generator is made separate from the air conditioner but may be integrated with the latter if it is dedicated to the air conditioner.

When the present invention is applied to an appliance having no demand function, on the other hand, this appliance may be connected with an adapter capable of turning ON/OFF the power source thereby to control the ON/OFF of the appliance through the adapter. At this time, the demand function may respond directly to the ON/OFF of the appliance so that the current to the appliance may be detected by the adapter or that a closer one may be selected from the selected values set in the adapter.

Figure 17:
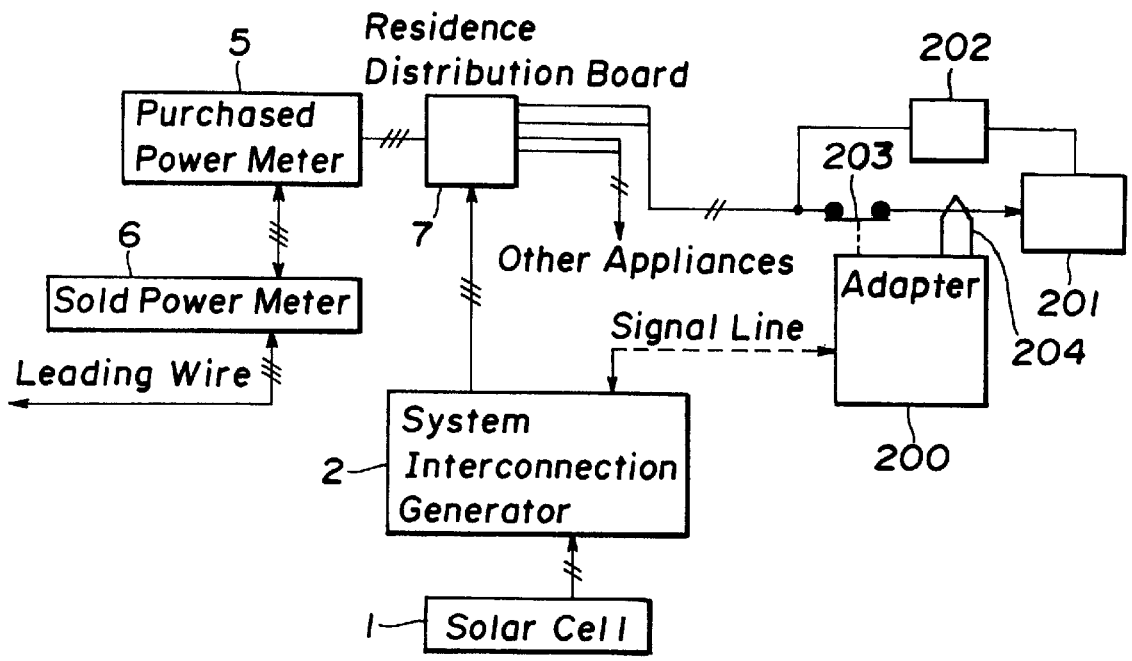
FIG. 17 is a schematic diagram showing the relation of the system interconnection generator of the present invention and another appliance.

FIG. 17 shows still another embodiment, in which the same components as those of FIG. 1 are designated by the same reference numerals. In FIG. 17 there are provided an adapter unit 200; an appliance 201; a timer unit 202; a normally closed contact 203 to be turned ON/OFF by the adapter; and a current detector 204 for detecting the current flowing through the appliance.

The appliance 201 is a ventilator which is disposed in the loft, under the floor or in the house or space left unused for a long time, and its drive power is supplied through the normally closed contact 203 from the residence distribution board 7.

The timer unit 202 outputs a running signal to the ventilator 201 for running it for a constant time period for every time periods or at every predetermined time intervals.

The adapter 200 decides the run/stop of the ventilator 204 by the current detector 204 and detects the current to the ventilator 201 thereby to send the state to the system interconnection generator 2. In response to the demand signal from the system interconnection generator 2, the adapter 200 controls the ON/OFF of the normally open contact 203.

In the appliance thus constructed, the ventilator 201 is run for the predetermined time period at the predetermined time interval so long as there is the integration of the power generated by the solar cell.

In short, the ventilator is operated substantially only by the solar cell so that power may not be purchased from the system.

This appliance should not be limited to the ventilator but can be applied to any if this matches the adapter.

Figure 18:
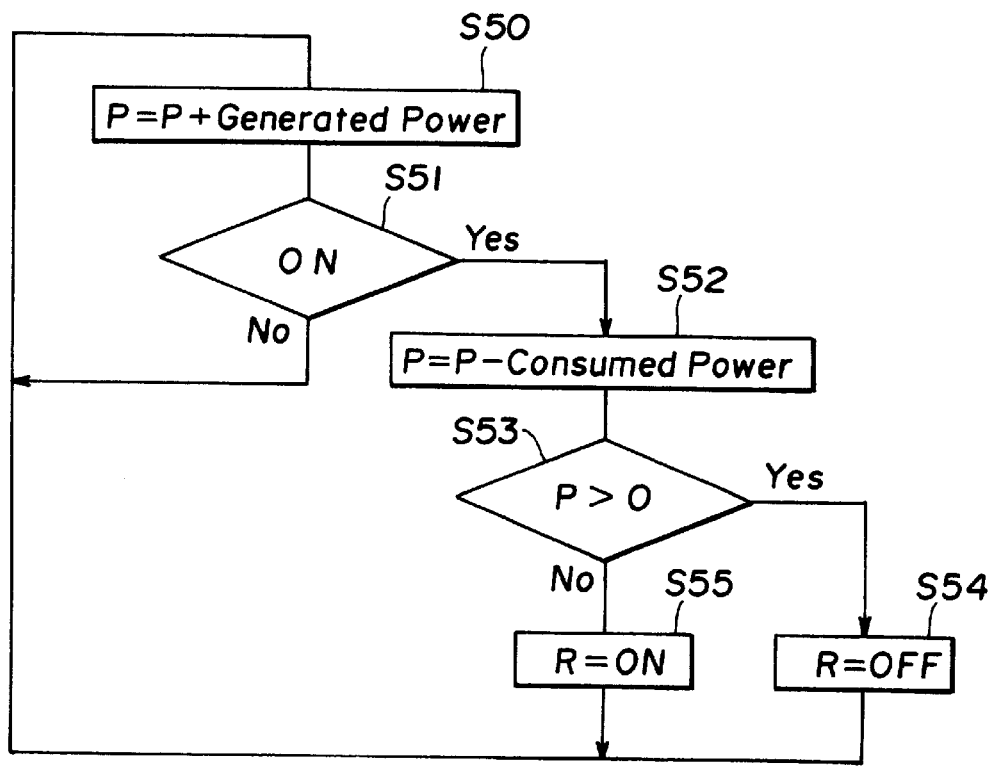
FIG. 18 is a flow chart showing the major operations of the adapter and the temperature sensor.

FIG. 18 is a flow chart showing the major operations of the adapter 200 and the system interconnection generator 2. In this flow chart, at Step S50, the power generated by the solar cell is integrated to determine the integrated value P. Next, at Step S51, it is decided whether or not the ventilator 201 is running. This decision depends upon whether or not the current to the ventilator 201 is detected (or whether or not a predetermined amount or more current has flown) by the adapter 200. If the ventilator 201 is not run, the routine advances to Step S50, at which the generated power is integrated.

If the ventilator 201 is run, the routine advances to Step S52, at which the consumed power of the ventilator 201 is determined from the current flowing to the ventilator 201 from the adapter 200 and is subtracted from the integrated value P.

Next, at Step S53, it is decided whether or not the integrated value P is "P>0". If this answer is YES, the routine advances to Step S54, at which the auxiliary relay is left inactive to close the normally closed contact 203 thereby to make it possible to run the ventilator 201. If the "P>0" is not satisfied, the routine advances to Step S55, at which the auxiliary relay is actuated to open the normally closed contact 203 thereby to stop the run of the ventilator 201.

After this, the routine advances to Step S50, at which the integration of the generated power is repeated.

According to the first aspect of the present invention thus far described, the distortion is corrected at the time of outputting the same next phase in accordance with the distortion of a current waveform so that a theoretically ideal current waveform can be achieved.

According to the second aspect of the present invention, moreover, the phase of the power to be outputted to the system is adjusted to prevent the distortion of the waveform coming out of shift and to suppress the distortion of the waveform due to the characteristics of the individual appliance parts so that a more ideal current waveform can be achieved.

By adjusting the phase of the AC power, as to be outputted from the system interconnection generator to the system, to the zero-cross point of the system, it is also possible to achieve the phase adjustment easily.

What is claimed is:

1. A system interconnection generator in which DC power is converted into AC power based on pulse width modulation theory to supply the AC power to a commercial AC power line, and in which one cycle of the AC power based on the pulse width modulation theory is divided into a plurality of sections so that an ON duty of each of the plurality of sections is controlled in accordance with the pulse width modulation theory, said system interconnection generator comprising:

a current sensor for detecting electric current supplied from said system interconnection generator to the commercial AC power line; and a correction unit for judging a difference-containing section, among the plurality of sections, which contains a point where a value of the electric current detected by said current sensor is different from a predetermined current value obtained from a predetermined sine waveform, and for correcting, using the pulse width modulation theory, the ON duty of a section which contains a point having a phase which is advanced 360° from the difference-containing section so that a detected value of electric current reaches a value of electric current obtained from the predetermined sine waveform when one cycle of the AC power based on the pulse width modulation theory is passed from the judged difference-containing section.

2. A system interconnection generator as claimed in claim 1, wherein the DC power is solar energy.

3. A system interconnection generator as claimed in claim 1, wherein the predetermined sine waveform has a theoretical sine waveform.

4. A system interconnection generator as claimed in claim 3, wherein a predetermined phase angle of a current waveform of the commercial AC power line is positioned at a changing angle of current direction of the current waveform of the commercial AC power line.

5. A system interconnection generator as claimed in claim 3, further comprising a memory for storing data of the predetermined sine waveform.

6. A system interconnection generator as claimed in claim 2, further comprising a power converting unit for converting the solar energy into the AC power by using a voltage chopping waveform, the ON duty of the voltage chopping waveform being adjusted to thereby supply the converted AC power to the commercial AC power line.

* * * * *